United States Patent [19]

Andrejewski et al.

[11] Patent Number: 5,211,877
[45] Date of Patent: May 18, 1993

[54] LIQUID-CRYSTALLINE POLYORGANOSILOXANES CONTAINING (METH) ACRYLOXY GROUPS

[75] Inventors: Dirk Andrejewski; Magdi Gohary; Hans-Joachim Luckas; Rainer Winkler, all of Munich; Franz-Heinrich Kreuzer, Martinsried, all of Fed. Rep. of Germany

[73] Assignee: Consortium für elektrochemische Industrie GmbH, Munich, Fed. Rep. of Germany

[21] Appl. No.: 401,261

[22] Filed: Aug. 31, 1989

[30] Foreign Application Priority Data

Sep. 8, 1988 [DE] Fed. Rep. of Germany ....... 3830592

[51] Int. Cl.$^5$ ...................... C09K 19/52; C08G 77/04; C08G 77/12; C07F 7/04
[52] U.S. Cl. .............................. 252/299.01; 252/299.6; 252/299.67; 252/299.7; 528/26; 528/30; 528/31; 528/32; 556/466; 556/478
[58] Field of Search ............. 252/299.1, 299.6, 299.67, 252/299.7; 556/466, 478, 420, 421, 445, 450, 462; 528/15, 30, 31, 32, 33, 41, 26, 27, 28, 29

[56] References Cited

U.S. PATENT DOCUMENTS

| | | | |
|---|---|---|---|
| Re. 30,544 | 3/1981 | Weinberg et al. | 260/429 R |
| 4,316,041 | 2/1982 | Totten et al. | 556/420 |
| 4,358,391 | 11/1982 | Finkelmann et al. | 252/299.01 |
| 4,388,453 | 6/1983 | Finkelmann et al. | 528/15 |
| 4,410,570 | 10/1983 | Kreuzer et al. | 427/374.1 |
| 4,738,880 | 4/1988 | Asada et al. | 428/1 |
| 4,774,028 | 9/1988 | Imai et al. | 260/397.2 |
| 4,908,228 | 3/1990 | Lo | 427/54.1 |
| 4,920,184 | 4/1990 | Schafer et al. | 525/477 |
| 4,981,607 | 1/1991 | Okawa et al. | 252/299.01 |

*Primary Examiner*—Robert L. Stoll
*Assistant Examiner*—Shean C. Wu

[57] ABSTRACT

The present invention relates to liquid-crystalline compounds and to a process for preparing liquid-crystalline polyorganosiloxanes having methacryloxy and/or acryloxy groups by the reaction of organosiloxanes having hydrogen atoms bonded directly to silicon atoms and/or organosilanes which can be condensed to form organosiloxanes having hydrogen atoms bonded directly to silicon atoms, with alkenes and/or alkynes having mesogenic groups, which comprises reacting in a first step the organosiloxanes with an alkene and/or alkyne having at least one non-enolic hydroxyl group protected by a protective group, and in a second step the protective group is removed and the hydroxyl group which is now free is esterified with (meth)acrylic acid, esters, anhydrides and/or halides thereof and thereafter optionally condensing the organosilanes to organosiloxanes.

29 Claims, No Drawings

LIQUID-CRYSTALLINE POLYORGANOSILOXANES CONTAINING (METH) ACRYLOXY GROUPS

The present invention relates to liquid-crystalline polyorganosiloxanes and particularly liquid-crystalline polyorganosiloxanes containing acryloxy- and/or methacryloxy groups. More particularly, the invention relates to a process for preparing liquid-crystalline polyorganosiloxanes, a process for crosslinking the liquid-crystalline organopolysiloxanes and the crosslinked liquid-crystalline polyorganosiloxanes.

BACKGROUND OF THE INVENTION

Liquid-crystalline polyorganosiloxanes containing (meth)acryloxy groups have been prepared by the addition of allyl acrylate or allyl methacrylate to organohydrogen-polysiloxanes. (See EP-B 0,066,137 U.S. Pat. No. 4,388,453 H. Finkelmann et al, Consortium für elektrochemische Industrie GmbH).

Methacryloxy and acryloxy groups are introduced into liquid-crystalline polyorganosiloxanes so that the latter can be three-dimensionally crosslinked. This crosslinking can occur for example by radical reaction or ionic reaction at the ethylenic double bonds of the (meth)acryloxy groups. Thus, in order to be able to obtain a high-grade three-dimensionally crosslinked liquid-crystalline polyorganosiloxane, it is desirable to introduce as high as possible proportion of (meth)acryloxy groups into the polyorganosiloxane.

If, however, liquid-crystalline polyorganosiloxanes having a high content of (meth)acryloxy groups are prepared according to the prior art processes mentioned above, only hazy and rough films can be produced with these materials after they have been oriented.

Therefore, it is an object of the present invention to provide liquid-crystalline polyorganosiloxanes having (meth)acryloxy functional groups and compositions containing the said polyorganosiloxanes, which are not hazy even with a high proportion of (meth)acryloxy groups. Another object of the present invention is to provide polyorganosiloxanes of the type mentioned above, from which smooth films can be produced. A further object of the present invention is to provide high-grade three-dimensionally crosslinked clear liquid-crystalline polyorganosiloxanes.

SUMMARY OF THE INVENTION

The foregoing objects and others which will become apparent from the following description are accomplished in accordance with this invention, generally speaking, by providing a process for preparing liquid-crystalline polyorganosiloxanes having methacryloxy and/or acryloxy groups by reacting an organosilicon compound selected from the group consisting of organosiloxanes having hydrogen atoms bonded directly to silicon atoms, organosilanes which can be condensed to form organosiloxanes and have hydrogen atoms bonded directly to silicon atoms and mixtures thereof with alkenes and/or alkynes having mesogenic groups which comprises reacting in a first step the organosiloxanes and/or organosilanes with an alkene and/or alkyne having at least one non-enolic hydroxyl group protected by a protective group, and in a second step removing the protective group and esterifying the hydroxyl group which is now free with (meth)acrylic acid, esters, anhydrides and/or halides thereof and thereafter optionally condensing the organosilanes to organosiloxanes.

DESCRIPTION OF THE INVENTION

The organosiloxanes mentioned above having hydrogen atoms bonded directly to silicon atoms are preferably those having units of the formula (I):

$$[R_p H_q SiO_{(4-p-q)/2}] \qquad (I)$$

in which

R is the same or different and represents $C_1$ to $C_{18}$ substituted and unsubstituted hydrocarbon radicals;

p is an integer having a value of from 0 to 3 with an average value of from 1.8 to 2.2;

q is an integer having a value of from 0 to 3, with an average value such that at least three hydrogen atoms are directly bonded to silicon atoms per molecule, and the sum of p and q is a maximum of 3.

Examples of unsubstituted hydrocarbon radicals represented by R are alkyl radicals such as the methyl, ethyl, n-propyl, isopropyl, n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, octadecyl radicals, such as the n-octadecyl radical; alkenyl radicals, such as the vinyl and the allyl radicals; cycloalkyl radicals, such as cyclopentyl, cyclohexyl, cycloheptyl radicals and methylcyclohexyl radicals; aryl radicals, such as the phenyl, naphthyl and anthryl and phenanthryl radicals; alkaryl radicals, such as o-, m-, p-tolyl radicals, xylyl radicals and ethylphenyl radicals; aralkyl radicals, such as the benzyl radical, and the α- and β-phenylethyl radicals.

Examples of substituted hydrocarbon radicals represented by R are cyanoalkyl radicals, such as the β-cyanoethyl radical, and halogenated hydrocarbon radicals, for example, the halogenoalkyl radicals, such as the 3,3,3-trifluoro-n-propyl radical, the 2,2,2,2',2',2'-hexafluoroisopropyl radical, the heptafluoroisopropyl radical, and halogenoaryl radicals, such as the o-, m- and p-chlorophenyl radicals. Preferably, R represents a hydrocarbon radical or a halogenated hydrocarbon radical with from 1 to 18, and more preferably from 1 to 10 carbon atoms.

More preferably, radicals represented by R are $C_1$ to $C_4$ alkyl radicals and phenyl radicals, especially methyl radicals.

Particularly preferred siloxanes of formula (I) are those having at least 90 percent of their units selected from units of the formulae $$[(CH_3)_2 SiO] \text{ (II)}, [(CH_3)HSiO] \text{ (III)},$$

$$[H(CH_3)_2 SiO_{\frac{1}{2}}] \text{ (IV) and } [(CH_3)_3 SiO_{\frac{1}{2}}] \text{ (V)}.$$

Organosilanes which can be condensed to form organosiloxanes having hydrogen atoms bonded directly to silicon atoms are preferably those of formula (VI)

$$R_r H_s SiY_{(4-r-s)} \qquad (VI)$$

or mixtures thereof, where R in formula (VI) has the same meaning as in formula (I);

Y represents a condensable group, preferably a $C_1$ to $C_4$ alkoxy group or a halogen atom;

r represents an integer having a value of 0 or 1;

s represents an integer having a value of from 0 to 3, with an average value of at least 0.1 and the sum of r and s is a maximum of 3.

Preferably, Y represents a chlorine atom or a methoxy or ethoxy group. The value of s is preferably a maximum of 1.

Any alkenes or alkynes having mesogenic groups, which have been or could have been prepared heretofore, may be used in the preparation of liquid-crystalline organo(poly)siloxanes by the addition of ethylenically or acetylenically unsaturated compounds containing mesogenic groups to the hydrogen atoms of organosilanes and organo(poly)siloxanes which are directly bonded to silicon atoms.

The term "mesogenic groups" is well known to those skilled in the art. They are those groups which can bring about liquid-crystalline properties in a molecule. Mesogenic groups are described by, among others, Dietrich Demus et al. ("Flüssige Kristalle in Tabellen", ("Tabulated liquid crystals"), published by VEB Deutscher Verlag für Grundstoff-industrie). The mesogenic groups mentioned therein are incorporated by reference in the specification of this invention.

Examples of mesogenic groups are derivatives of cyclohexane, such as cyclohexyl cyclohexanecarboxylate, phenyl cyclohexanecarboxylate, cyclohexyl phenyl ether, cyclohexylbenzenes, dicyclohexyl derivatives, derivatives of stilbene, phenyl benzoate and its derivatives, steroids, such as cholesterol, derivatives thereof, such as cholesteryl esters, cholestane and derivatives thereof, benzylidene anilines, azobenzene and its derivatives, azoxybenzene and derivatives thereof, alkyl derivatives and alkoxy derivatives of biphenyl, and Schiff bases.

It is often desired for application purposes that the mesogenic groups contain polar functional groups, such as for example, the nitrile group, in order to achieve a high dielectrical anisotropy effect in the liquid crystal.

Alkenes or alkynes having mesogenic groups which can be used in the process of this invention are preferably those of formula (VII):

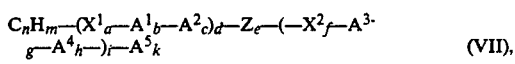

(VII), in which n represents an integer having a value of from 1 to 20;

m has a value 2n, or, if n is at least 2, it can also have a value of (2n-3);

$X^1$ and $X^2$ represents the same or different divalent radicals selected from the group —O—, —COO—, —CONH—, —CO—, —S—, —C≡C—, CH=CH—, —CH=N—, —N=N— and —N=N(O)—;

$A^1$, $A^2$, $A^3$ and $A^4$ represent the same or different divalent radicals; namely, 1,4-phenylene, and 1,4-cyclohexylene radicals, substituted arylenes having from 1 to 10 carbon atoms, substituted cycloalkylenes having from 1 to 10 carbon atoms and heteroarylenes having from 1 to 10 carbon atoms;

Z represents the same or different divalent, trivalent or tetravalent radicals such as benzene, cyclohexane or cyclopentane radicals, $A^5$ represents the same or different, saturated or olefinically unsaturated alkyl, alkoxy or cycloalkyl radicals having from 1 to 16 carbon atoms, cholestane radicals, cholesteryl radicals, halogen atoms, hydrogen atoms, hydroxyl, nitrile and trialkylsiloxy groups, in which the alkyl radicals have from 1 to 8 carbon atoms;

a, b, c, d, f, g, h, i and k each represent the same or different integers having a value of from 0 to 3, the sum of d and i is a maximum of 4; e represents a number having a value of 0 or 1 and the sum of a+b+c+d+e+f+g+h+i+k is at least 2.

The radicals represented by $X^1$ and $X^2$ may, if they are not symmetrically structured, be bonded at either of their ends to either of their bonding partners. Thus, for example in the formula (VII) above and in the formulas listed below the radical —COO— may also be bonded as —OOC—, the radical —CONH— also as —NHCO—, and —CH=N— also as —N=CH—.

Preferred substituents for the substituted arylenes and cycloalkylenes $A^1$, $A^2$, $A^3$ and $A^4$ are halogen atoms, $C_1$ to $C_4$ alkoxy radicals, nitro and cyano groups, $C_1$ to $C_6$ alkyl radicals, carboxy($C_1$ to $C_4$ alkyl) radicals and tri($C_1$ to $C_4$ alkyl)siloxy radicals.

Preferably n has a value of from 2 to 5 and m preferably has the value 2n.

Examples of radicals represented by $A^5$ are alkyl radicals, such as the methyl, ethyl, n-propyl, isopropyl, n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, hexadecyl radicals, such as the n-hexadecyl radicals; alkenyl radicals, such as the vinyl and the allyl radicals, butenyl, pentenyl, hexenyl, heptenyl, octenyl, octadienyl, decenyl, dodecenyl and hexadecenyl radicals; cycloalkyl radicals, such as cyclopentyl, cyclohexyl, cycloheptyl radicals and methylcyclohexyl radicals; alkyloxy radicals, such as the methoxy, ethoxy, n-propoxy, isopropoxy, n-, sec- and tert-butoxy radicals, pentoxy, hexoxy, octoxy, decoxy, hexadecoxy radicals; alkenoxy radicals, such as the allyloxy radical, butenyloxy, pentenyloxy, hexenyloxy, octenyloxy, decenyloxy and hexadecenyloxy radicals; cycloalkyl radicals, such as the cyclopentyl, cyclohexyl, cycloheptyl radical; cycloalkenyl radicals, such as cyclopentenyl, cyclohexenyl and cycloheptenyl radicals; cholestane radicals; the cholesteryl radical; fluorine, chlorine or bromine atoms; hydrogen atoms; hydroxyl, nitrile and trimethylsilyl, triethylsilyl groups. It is especially preferred that $—C_nH_m—(X^1_a—A^1_b—A^2_c-)_d—$ in formula (VII) above represents a radical of formula (VIII):

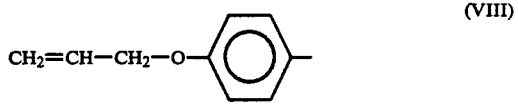

Particularly preferred compounds of formula (VII) are those of formula (IX):

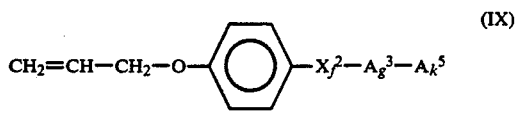

in which $X^2$, $A^3$, $A^5$, f, g and k are the same as in formula (VII) and preferably f has a value of 1, g is either 0 or 1 and k a value of 1.

Any alkene and/or alkyne having at least one non-enolic hydroxyl group protected by a protective group which can be added to organosilicon compounds having hydrogen atoms bonded directly to silicon atoms, and whose hydroxyl group can be esterified after removal of the protective group can be used in the process of this invention.

Alkenes are preferred to alkynes due to their availability.

Protective groups for hydroxyl groups are well known and are described in, among other publications, Houben-Weyl, Methoden der organischen Chemie, 4. Auflage, Band VI/1b Alkohole III (Methods of Organic Chemistry, 4th edition, Volume VI/1b Alcohols III), published by Georg Thieme Verlag, Stuttgart on pages 735 et seq. The hydrogen atom of the hydroxyl group can thus for example be replaced by a tert-butyl, benzyl, triphenylmethyl, trialkylsilyl, formaldehydeacetal, acetaldehydeacetal, O,N-acetal, O,O-acetal group, carboxylic acid ester-group, such as chloroacetic acid ester group, or orthoester group. The chemical nature of the protective group plays no part itself in the process of this invention. It is essential that the protective group be stable during the addition of the alkene and/or alkyne to hydrogen atoms directly bonded to silicon atoms, but which can be removed after this reaction under essentially inert conditions with respect to the product.

In the process of this invention, acid-labile protective groups are preferred, particularly the tri($C_1$ to $C_4$ alkyl)-silyl group, the tert-butyl, triphenylmethyl and the orthoformate group, and more preferably the tri($C_1$ to $C_4$ alkyl)silyl group.

It is preferred that the alkene and/or alkyne have at least one non-enolic hydroxyl group protected by a protective group, and more preferably, the alkene have up to 30 carbon atoms and a non-enolic hydroxyl group blocked by a protective group. It is possible for the alkene to have other atoms in addition to carbon and hydrogen atoms, preferably oxygen atoms, and it is also possible for these oxygen atoms to interrupt the carbon chain of the alkene in the manner of an ether and/or ester linkage.

Particularly preferred alkenes having a blocked hydroxyl group are those of formula (X):

$$CH_2=CH-R''-O-SiR'_3 \qquad (X)$$

in which

R' represents the same or different $C_1$ to $C_4$ alkyl radicals, preferably methyl radicals; and R" represents a divalent radical from the group of compounds of formula (XI) and (XII):

$$-C_tH_{2t}- \qquad (XI)$$

and

$$-CH_2-A^1-X^1-A^2-, \qquad (XII)$$

in which t represents an integer having a value of from 1 to 18 and $A^1$, $A^2$ and $X^1$ are the same as those given in formula (VII). In particular, 1,4-phenylene radicals are preferred examples for $A^1$ and $A^2$ in formula (XII) above.

The reaction of both the alkenes and/or alkynes having mesogenic groups and the alkenes and/or alkynes having at least one hydroxyl group protected by a protective group, with organosiloxanes and/or organosilanes is preferably carried out in the presence of a catalyst containing metals of the platinum group and/or compounds thereof. Preferred metals of the platinum group and/or compounds thereof are platinum and/or compounds thereof. All catalysts may be used which have been or could have been used heretofore for the addition of hydrogen atoms bonded directly to Si atoms to aliphatically unsaturated compounds. Examples of catalysts of this type are metallic and finely divided platinum, which can be supported on carriers, such as silicon dioxide, aluminum oxide or activated charcoal, compounds or complexes of platinum, such as platinum halides, for example $PtCl_4$, $H_2PtCl_6.6H_2O$, $Na_2PtCl_4.4H_2O$, platinum-olefin complexes, platinum-alcohol complexes, platinum-alcoholate complexes, platinum-ether complexes, platinum-aldehyde complexes, platinum-ketone complexes, including products made from $H_2PtCl_6.6H_2O$ and cyclohexanone, platinum-vinylsiloxane complexes, particularly platinum-divinyltetramethyldisiloxane complexes with or without a detectable amount of inorganically bound halogen, bis(gamma-picoline)platinum dichloride, trimethylenedipyridine platinum dichloride, dicyclopentadiene platinum dichloride, dimethylsulfoxide ethylene platinum(II) dichloride and reaction products of platinum tetrachloride with an olefin and primary amine or secondary amine or primary and secondary amine, such as the reaction product from platinum tetrachloride dissolved in 1-octene with sec-butylamine, or ammonium platinum complexes according to EP-B 110,370.

The platinum catalyst is preferably used in amounts of from 0.5 to 500 ppm by weight (parts by weight per million parts by weight), particular 2 to 400 ppm by weight, calculated as elemental platinum and based on the total weight present in the reaction mixture of silanes and/or siloxanes having hydrogen atoms bonded directly to silicon atoms.

The reaction of organosiloxanes and/or organosilanes which can be condensed to give organosiloxanes having in each case hydrogen atoms bonded directly to silicon, with alkenes and/or alkynes having mesogenic groups and on the other hand with an alkene and/or alkyne having at least one hydroxyl group protected by a protective group, can be carried out simultaneously or successively in any desired order. It is preferably carried out simultaneously.

The reaction (termed hydrosilylation) may be carried out in the absence or in the presence of a solvent, in which the presence of a solvent is preferred.

If solvents are used, the solvents or solvent mixtures preferred are those which are substantially inert under the reaction conditions and particularly those having a boiling point or boiling range up to about 120° C. at 0.1 MPa. Examples of solvents of this type are ethers, such as dioxane, tetrahydrofuran, diethyl ether, diethylene glycol dimethyl ether; chlorinated hydrocarbons, such as dichloromethane, trichloromethane, tetrachloromethane, 1,2-dichloroethane, trichloroethylene; hydrocarbons, such as pentane, n-hexane, mixtures of hexane isomers, heptane, octane, solvent naphtha, petroleum ether, benzene, toluene, xylenes; ketones, such as acetone, methyl ethyl ketone, methyl isobutyl ketone; carbon disulfide and nitrobenzene, or mixtures of these solvents.

The term solvent does not mean that all reaction components are soluble in the solvent. The reaction can also be carried out in a suspension or emulsion of one or more reactants. The reaction can also be carried out in a solvent mixture in which at least one reactant is soluble in each case in each of the mixed phases.

The hydrosilylation can be carried out at the pressure of the surrounding atmosphere, thus at about 0.1 MPa (abs.), and it may also be carried out at higher or lower pressures. Preferred pressures are from 0.01 MPa (abs.) to 1.0 MPa (abs.), particularly from 0.09 MPa (abs.) to 0.11 MPa (abs.).

The hydrosilylation is preferably carried out at temperatures of from 0° C. to 150° C., and more preferably from 60° C. to 100° C.

Preferably, 0.1 to 10 mol, and more preferably 0.5 to 2 mol of compounds of formulas (VII) and (X) are used per gram atom of hydrogen atoms bonded directly to silicon atoms, in the hydrosilylation.

The molar ratio of the compound of formula (VII) used, excluding the compound of formula (X), to the compound of formula (X) is preferably from 0.01 to 99, preferably from 0.1 to 10, and more preferably from 0.5 to 2.

The product of the hydrosilylation need not be separated and is preferably not separated from the reaction mixture. The subsequent reaction steps, i.e., splitting off of the protective group and esterification of the now unprotected hydroxyl group, are preferably carried out in the same reaction vessel as the hydrosilylation.

The reaction conditions for splitting off the protective group depend on the type of protective group selected and are well known. They are given in, among other publications, Houben-Weyl listed above and in the textual references given there. The tri($C_1$ to $C_4$ alkyl)silyl group, which as mentioned above, is the preferred protective group, is preferably removed under catalysis by acids or bases. Acids and bases which can be used are any known acids and bases which are essentially inert to the other portion of the desired reaction product.

Examples of acids are Lewis acids, such as $BF_3$, $AlCl_3$, $TiCl_3$ $SnCl_4$, $SO_3$, $PCl_5$, $POCl_3$, $FeCl_3$ and hydrates thereof and $ZnCl_2$; Brönstedt acids, such as hydrochloric acid, hydrobromic acid, sulfuric acid, chlorosulfonic acid, phosphoric acids, such as ortho-, meta- and polyphosphoric acids, boric acid, selenious acid, nitric acid, acetic acid, propionic acid, halogenoacetic acids, such as trichloroacetic acid and trifluoroacetic acid, oxalic acid, p-toluenesulfonic acid, acid ion exchangers, acid zeolites, acid activated bleaching earth, acid activated carbon black, hydrogen fluoride, hydrogen chloride and the like.

Examples of bases are Lewis bases such as ammonia, amines and cyanide; Brönstedt bases, such as NaOH, KOH, CsOH, tri($C_1$ to $C_4$ alkyl)ammonium hydroxide, tetra-n-butylphosphonium hydroxide, $Mg(OH)_2$, $Ca(OH)_2$, carbonates and hydrogen carbonates of Li, Na, K, Rb, Cs, Mg, Ca, Sr and Ba and the like. Due to their availability, NaOH and KOH are the preferred bases and hydrochloric acid and sulfuric acid are the preferred acids. The bases may be used in bulk or dissolved in a solvent, preferably methanol or ethanol. The splitting off of the trialkylsiloxy groups mentioned above is preferably carried out at elevated temperatures, preferably at temperatures from 30° C. to 150° C., and more preferably from 60° C. to 90° C. Pressures of from 0.09 to 0.11 MPa (abs.) are preferred.

Low boiling components are preferably removed from the reaction mixture during the splitting off of the trialkylsiloxy groups mentioned above.

The subsequent esterification may be carried out with any derivative of acrylic acid and/or methacrylic acid which has also been used heretofore in the esterification of hydroxyl groups. In particular, the esters, anhydrides and/or halides of these acids are used in the esterification. The chlorides and the anhydrides are preferred, particularly the anhydrides of the acids mentioned above.

Preferably, 0.1 to 100 equivalents, and more preferably from 1 to 2 equivalents of the derivatives of (meth)acrylic acid are used per hydroxyl group which is to be esterified.

All of the reactants mentioned above, catalysts, solvents, photoinitiators, UV light sources, etc. can be used individually or as a mixture. For example, a compound selected from formulas (I), (VI), (VII), (X), (XIII), a platinum catalyst, and a solvent may be used, as well as mixtures of the substances mentioned above may be used.

If organosilanes of formula (VI) are used in the process described above, they can be subsequently polycondensed by processes known heretofore to form liquid-crystalline organopolysiloxanes. This can be carried out by, among other means, reaction with acids, such as dilute hydrochloric acid. Processes of this type are described in W. Noll: Chemistry and Technology of Silicones, Academic Press, Orlando Fla., 1968, page 191 to 239.

The liquid-crystalline polyorganosiloxanes of this invention having methacryloxy and/or acryloxy groups and which can be prepared according to the process of this invention can be three-dimensionally crosslinked. This crosslinking is preferably carried out by means of free radicals, which are produced by peroxides, by UV light or by electromagnetic radiation of higher energy than UV light, or thermally. The crosslinking can, however, also be carried out by means of crosslinking agents containing hydrogen atoms directly bonded to silicon atoms in the presence of metal catalysts of the platinum group mentioned above. Crosslinking can also be carried out cationically or anionically. Crosslinking by UV light is especially preferred.

Ultraviolet light means electromagnetic radiation with a wavelength from 13 nm to 400 nm, preferably from 100 nm to 400 nm. In this case, crosslinking by UV light means crosslinking with the aid of a radiation source which has a greater intensity of UV light than normal sunlight at the earth's surface. Preferred UV radiation sources are those having a maximum intensity in the range of from 200 nm to 400 nm. UV lamps of this type are commercially available.

The compositions of this invention, which are crosslinkable by UV light, preferably contain in addition to the liquid-crystalline organopolysiloxanes of this invention, other compounds of formula (XIII):

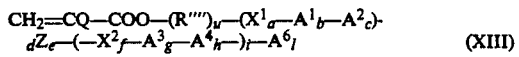

(XIII)

in which $A^6$ is the same as $A^5$ or is a radical of the formula

Q represents a hydrogen atom or a methyl group,

R'''' is the same or different divalent radicals selected from the group —CH$_2$—, —O—CH$_2$—, —O—CH$_2$—CH$_2$— and —O—CH$_2$—CH$_2$—CH$_2$—, u is an integer having a value of from 0 to 20, l is 0 or 1, and X$^1$, X$^2$, A$^1$, A$^2$, A$^3$, A$^4$, A$^5$, a, b, c, d, e, f, g, h, i and k are the same as formula (VII).

The compositions of this invention, which are cross-linkable by UV light, preferably contain compound(s) of formula (XIII) in amounts of from 0.1 part by weight to 90 parts by weight, preferably from 5 parts by weight to 50 parts by weight, based on the weight of the liquid-crystal-line organopolysiloxanes used according to this invention.

The compounds of formula (XIII) primarily have the function of reducing the viscosity of the composition according to this invention.

Preferred compounds of formula (XIII) are those of formula (XIV):

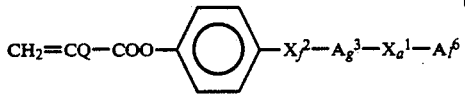

(XIV)

in which Q represents a hydrogen atom or a methyl group and X$^1$, X$^2$, A$^3$, A$^6$, a, f, g and l are the same as formula (VII) and preferably f has a value of 1, and a and g have in each case a value of 0 or 1.

Preferred compounds of formula (XIV) are 4-(prop-2-en-1-oxy)phenyl - 4-methacryloxybenzoate, (4-methacryloxy)phenyl - 4-(prop-2-en-1-oxy)benzoate, (4-methacryloxy)phenyl - 4-(methacryloxy)benzoate and (4-methacryloxy)phenyl - 4-(propyl-1-oxy)benzoate.

The compositions of this invention are preferably crosslinked by UV light in the presence of photoinitiators and/or photosensitizers.

Suitable photoinitiators and photosensitizers are in each case optionally substituted acetophenones, propiophenones, benzophenones, anthraquinones, benzils, carbazoles, xanthones, thioxanthones, fluorenes, fluorenones, benzoins, naphthalenesulfonic acids and benzaldehydes and cinnamic acids.

Examples of photoinitiators and photosensitizers are fluorenone, fluorene, carbazole; acetophenone; substituted acetophenones, such as 3-methylacetophenone, 2,2'-dimethoxy-2-phenylacetophenone, 4-methylacetophenone, 3-bromoacetophenone, 4-allylacetophenone, p-diacetylbenzene, p-tert-butyltrichloroacetophenone; propiophenone; substituted propiphenones, such as 1-[4-(methylthio)phenyl]-2-morpholinopropan-1-one, benzophenone; substituted benzophenones, such as Michler's ketone, 3-methoxybenzophenone, 4,4'-dimethylaminobenzophenone, 4-methylbenzophenone, 4-chlorobenzophenone, 4,4'-dimethoxybenzophenone, 4-chloro-4'-benzylbenzophenone; xanthone; substituted xanthones, such as 3-chloroxanthone, 3,9-dichloroxanthone, 3-chloro-8-nonylxanthone; thioxanthone; substituted thioxanthones, such as isopropenylthioxanthone; anthraquinone; substituted anthraquinones, such as chloroanthraquinone and disodium anthraquinone-1,5-disulfonate; benzoin; substituted benzoins, such as benzoin methyl ether; benzil; 2-naphthalenesulfonyl chloride; benzaldehyde; cinnamic acid.

Photoinitiators and/or photosensitizers are preferably used in the compositions of this invention in amounts of from 0.01 to 10 percent by weight, particularly from 0.5 to 5 percent by weight, based on the weight of the liquid-crystalline organopolysiloxane.

Moreover, it is preferable to add polymerization inhibitors to the compositions of this invention, preferably in an amount of from 1 ppm to 5,000 ppm, and more preferably from 100 to 1,000 ppm, based on the total weight of the composition.

Preferred polymerization inhibitors are dihydroxybenzenes, which are optionally substituted on the ring with C$_1$ to C$_6$ alkyl groups or etherified at one or both of the hydroxyl groups. Examples of polymerization inhibitors of this type are hydroquinone, p-methoxyphenol and p-tert-butylcatechol. Quinone derivatives and nitroso compounds are also effective as polymerization inhibitors.

The compositions of this invention may contain up to 50 percent by weight of non-mesogenic monomers and oligomers, preferably from 0.1 to 10 percent by weight, based on the weight of the composition. Examples of monomers and oligomers of this type are ethanediol di(meth)acrylate, hexanediol di(meth)acrylate, diethylene glycol di(meth)acrylate, triethylene glycol di(meth)acrylate, trimethylolpropane tri(meth)acrylate and α,w-divinylsiloxanes.

Moreover, the compositions of this invention may contain up to 50 percent by weight and more preferably, from 0.01 to 30 percent by weight of fillers based on the weight of the compositions.

Examples of fillers are non-reinforcing fillers, such as, fillers having a BET surface area of up to 50 m$^2$/g, such as quartz, diatomaceous earth, calcium silicate, zirconium silicate, zeolites, metal oxide powders, such as aluminum oxide, titanium oxide, iron oxide or zinc oxide or mixed oxides of these metals, barium sulfate, calcium carbonate, gypsum, silicon nitride, silicon carbide, boron nitride, glass powder and plastic powder; reinforcing fillers, such as fillers with a BET surface area of more than 50 m$^2$/g, such as pyrogenically produced silica, precipitated silica, carbon black, such as furnace black and acetylene black and mixed silicon-aluminum oxides having a large BET surface area; fibrous fillers, such as asbestos and synthetic fibers. The fillers may be treated to impart hydrophobicity thereto with, for example, organosilanes or organosiloxanes or by etherification of hydroxyl groups to form alkoxy groups. One type of filler may be used, or a mixture of at least two fillers may be used.

The compositions of this invention may also contain other materials, such as for example, pigments, plasticizers, coupling agents, other polymers, solvents, emulsifiers, rust inhibitors, stabilizers and other conventional additives.

The compositions of this invention are preferably crosslinked in a manner such that they are applied at temperatures of from −20° C. to +180° C., preferably at +20° C. to +100° C. to a substrate and are oriented by conventional methods, for example, by applying the melt with a doctor blade or by electrical or magnetic fields and, subsequently, exposing the composition to radiation from a UV lamp.

The novel compounds of formula (XV) are suitable starting materials for compounds and compositions of this invention

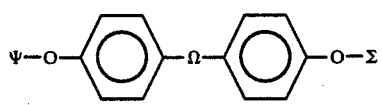 (XV)

in which

Ψ is a cholesteryl radical or a radical of the formula $CH_2=CH-CH_2-$,

Ω is a carboxyl radical of the formulas $-COO-$ or $-OCO$;

Σ is a hydrogen atom, a $C_1$ to $C_6$ tri(hydrocarbon)silyl group or a radical of the formula $CH_2=CQ-CO-$; and Q is a hydrogen atom or a methyl group.

Preferably, Q in formula (XV) represents a hydrogen atom. If it is a $C_1$ to $C_6$ tri(hydrocarbon)silyl group, the radical Σ preferably represents a trimethylsilyl group.

The synthesis of five compounds of formula (XV) are described below under (A), (B), (C), (D) and (E) prior to Example 1.

The three-dimensionally crosslinked liquid-crystalline polyorganosiloxanes of this invention can be used for the production of membranes for the separation of mixtures of substances (for example of gases such as oxygen and nitrogen) and for the selective release of active ingredients (for example, drugs and agrochemicals), in the optical display of electromagnetic fields (optoelectronics), in the field of information storage, of electrographic processes, of light modulation, as a component of polarizing films, optical filters, reflectors, in coatings, as lake pigments and stationary phases for gas and liquid chromatography.

They are particularly suitable for the coating of films, materials, leather, ceramics, wood, metal or plastics for decorative purposes.

Unless otherwise specified, the amounts are by weight; the pressures are 0.10 MPa (abs.); and temperatures are 20° C.

PREPARATION OF THE NOVEL STARTING COMPOUNDS ACCORDING TO FORMULA (XV)

(A). (4-Hydroxyphenyl)-4-(prop-2-en-1-oxy)benzoate

A solution containing 78.8 g of 4-(prop-2-en-1-oxy)-benzoyl chloride (obtainable according to DE-A 2,944,591) and 220.0 g of hydroquinone in 400 ml of dry tetrahydrofuran was boiled for 4 hours under reflux. After being concentrated the product was recrystallized from toluene and ethanol (1:1 parts by volume). Melting point: 146° C.

(B). (4-Trimethylsiloxyphenyl)-4-(prop-2-en-1-oxy)benzoate

About 30.0 g of hexamethyldisilazane (obtainable commercially from Wacker-Chemie GmbH) were added dropwise at 90° C. to a solution containing 66.0 g of (4-hydroxyphenyl)-4-(prop-2-en-1-oxy)benzoate [prepared according to (A) above], in 200 ml of dry toluene and the mixture thus obtained was boiled for 2 hours under reflux. The volatile components of the mixture were distilled off and the crude product recrystallized from toluene and hexane. The melting point was 87° C.

(C). 4-(prop-2-en-1-oxy)phenyl-4-trimethylsilyloxybenzoate

About 114 g of 4-trimethylsiloxybenzoyl chloride (prepared according to Chemical Abstracts 95, 150 756b or the literature reference cited therein) is added dropwise over 3.5 hours at 100° C. under a nitrogen atmosphere to a solution containing 75 g of 4-(prop-2-en-1-oxy)phenol (prepared according to Chemical Abstracts 66, 46 168b or the literature reference cited therein) in 400 ml of toluene and the mixture was subsequently boiled for an additional 6 hours under reflux. After cooling, the liquid phase was filtered off from any precipitated product and the solvent removed from the filtrate. The product was an oil which was extremely sensitive to hydrolysis.

(D) 4-(prop-2-en-1-oxy)phenyl-4-methacryloxybenzoate

A solution containing 16.9 g of 4-(prop-2-en-1-oxy)-phenyl-4-trimethylsilyloxybenzoate [prepared according to (C) above] in 15 ml of toluene and 10 ml of ethanol was boiled for 1 hour under reflux and then subsequently freed in vacuo from volatile components. The remaining 13.3 g of 4-(prop-2-en-1-oxy)phenyl-4-hydroxybenzoate were dissolved together with 30 g of methacrylic anhydride and 1.2 g of toluenesulfonic acid in 15 ml of toluene and heated at 100° C. for 1 hour. After cooling, the product was precipitated with hexane and recrystallized from ethanol. The thermodynamic 25 data are summarized in Table 1.

(E). Cholesteryl-4-methacryloxybenzoate

About 9.5 g of cholesteryl-4-hydroxybenzoate (prepared according to Chemical Abstracts 97: 150571d, ibid. 93: 120270e), 5.1 g of methacrylic anhydride and 0.4 g of p-toluenesulfonic acid were dissolved in 10 ml of toluene and heated at 100° C. for 30 minutes. After cooling, the product was precipitated with hexane and recrystallized from ethanol. The thermodynamic data are summarized in Table 1.

TABLE 1

| Examples | (D) | (E) |
|---|---|---|
| Glass transition temperature* [°C.] | −26 | 63 |
| Clarification temperature* [°C.] | 67 | 152 |

*determined with the addition of 500 ppm of p-tert-butyl-catechol

EXAMPLE 1

Polyorganosiloxanes With Mesogenic Side Groups Containing Acrylic Acid or Methacrylic Acid (a) A solution containing 259 g of cholesteryl-4-(prop-2-en-1-oxy)benzoate (prepared according to DE A 3,110,048), 162 g of (4-trimethylsiloxyphenyl)-4-(prop-2-en-1-oxy)benzoate [prepared according to (C) above], and 56.9 g of pentamethylcyclopentasiloxane in 400 ml of toluene were boiled under reflux for 1 hour in the presence of 24 mg of dicyclopentadieneplatinum dichloride and then for an additional 7 hours after the addition of a solution containing 1.2 g of NaOH in 50 ml of ethanol, in order to split the silyl ether. The reaction mixture was concentrated to ⅓ of its original volume, mixed with 7.5 g of p-toluenesulfonic acid and 154 g of methacrylic anhydride and heated at 100° C. for 1 hour. After distilling off the volatile components the mixture was recrystallized twice from methylene chloride/e- thanol. The physical and thermodynamic data are summarized in Table 2.

(b) A solution containing 8.0 g of cholesteryl-4-(prop-2-en-1-oxy)benzoate [cf. Example 1(a)] and 5.0 g of 4-(prop-2-en-1-oxy)phenyl-4-trimethylsilyloxybenzoate [prepared according to (C)] in 40 ml of toluene was added dropwise at 80° C. to a solution containing 1.76 g of hexamethylcyclohexasiloxane and 3 mg of dicyclopentadieneplatinum dichloride in 40 ml of toluene and the mixture was then subsequently boiled under reflux for 30 minutes. After adding 10 ml of ethanol and 0.2 g of potassium hydroxide, the mixture was heated under reflux for 20 minutes to split the silyl ether. Subsequently, the solution was concentrated to ⅓ of its original volume, mixed with 2.0 g of p-toluenesulfonic acid and 9.2 g of acrylic anhydride and again boiled under reflux for 30 minutes. In order to purify the crude product, reprecipitation was carried out twice from toluene/ethanol. The physical and thermodynamic data are summarized in Table 2.

(c) A solution containing 15.2 g of cholesteryl-4-(prop-2-en-1-oxy)benzoate [cf. Example 1 (a)] and 9.5 g of 4-(prop-2-en-1-oxy)phenyl-4-trimethylsilyloxybenzoate [prepared according to (C) above], in 60 ml of toluene was added dropwise at 80° C. to a solution containing 3.33 g of polymethyl-hydrogen-siloxane (viscosity: 16 mm/s at 25° C.) and 5 mg of dicyclopentadieneplatinum dichloride in 60 ml of toluene and the mixture was subsequently boiled under reflux for 30 minutes. After adding 10 ml of ethanol and 0.2 g of potassium hydroxide, the mixture was boiled under reflux for 20 minutes to split the silyl ether. The solution was subsequently concentrated to ⅓ of its original volume, mixed with 2.0 g of p-toluenesulfonic acid and 8.5 g of methacrylic anhydride and again boiled under reflux for 30 minutes. In order to purify the crude product, reprecipitation was carried out twice from toluene/ethanol. The physical and thermodynamic data are summarized in Table 2.

(d) A solution containing 2.0 g of 4-cyanophenyl-4-(prop-2-en-1-oxy)benzoate (prepared according to Chemical Abstracts 97, 110 521f or the literature reference cited therein), 5.72 g of 4-(prop-2-en-1-oxy)phenyl-4-trimethylsilyloxybenzoate [prepared according to (C) above], 1.43 g of hexamethylcyclohexasiloxane and 2 mg of dicyclopentadieneplatinum dichloride in 20 ml of toluene was boiled under reflux for 30 minutes. After adding 10 ml of ethanol and 0.2 g of potassium hydroxide, the mixture was boiled under reflux for 20 minutes to split the silyl ether. The solution was subsequently concentrated to ⅓ of its original volume, mixed with 2.0 g of p-toluenesulfonic acid and 15.4 g of methacrylic anhydride and again boiled under reflux for 30 minutes. After cooling, reprecipitation was carried out twice from toluene/ethanol. The physical and thermodynamic data are summarized in Table 2.

(e) A solution containing 3.28 g of cholesteryl-4-(prop-2-en-1-oxy)benzoate [cf. Example 1 (a)], 4.62 g of (4,4'-biphenyl)-4-(prop-2-en-1-oxy)benzoate (prepared according to DE-A 3,110,048), 2.28 g of 6-trimethylsiloxyhexene (prepared from the reaction of hex-1-en-6-ol with hexamethyldisilazane), 3 mg of dicyclopentadieneplatinum dichloride and 2.20 g of polymethylhydrogen-siloxane (average degree of polymerization 8) in 10 ml of toluene was boiled under reflux for 30 minutes. In order to split the silyl ether, 10 ml of ethanol and a drop of concentrated HCl were added. The mixture was refluxed for 1 hour and then concentrated to ⅓ of its original volume. Subsequently, 0.15 g of p-toluenesulfonic acid and 6.20 g of methacrylic anhydride were admixed and the mixture again boiled under reflux for 30 minutes. After cooling, reprecipitation was carried out twice from toluene/ethanol. The physical and thermodynamic data are summarized in Table 2.

TABLE 2

| Examples | 1(a) | 1(b) | 1(c) | 1(d) | 1(e) |
|---|---|---|---|---|---|
| Crosslinkable side groups [mol %] | 50 | 50 | 50 | 70 | 40 |
| Reflection peak [nm] | 510 | 630 | 676 | — | 420 |
| Haze+ [%] | 0 | 0 | 0 | 0 | 0 |
| Glass transition temperature* [°C.] | 48 | 60 | 53 | 25 | 4 |
| Clarification temperature* [°C.] | 190 | 199 | 195 | 94 | 90 |

+determined by measurement of the transmission at 800 nm
*determined with the addition of 500 ppm t-butylcatechol

EXAMPLE 2

Preparation of Formulations Which Are Suitable For Crosslinking (a) About 4.0 g of the methacrylated polymer prepared according to Example 1(a), 1.0 g of cholesteryl-4-methacryloxybenzoate [prepared according to (E) above], 1.0 g of 4-(prop-2-en-1-oxy)phenyl-4-methacryloxybenzoate [prepared according to (D) above] and 200 ppm of p-tert-butylcatechol are dissolved in methylene chloride and concentrated. The physical and thermodynamic data are summarized in Table 3.

(b) About 2.0 g of the methacrylated polymer prepared according to Example 1(c), 0.2 g of cholesteryl-4-methacryloxybenzoate [prepared according to (E) above], 0.6 g of 4-(prop-2-en-1-oxy)phenyl-4-methacryloxybenzoate [prepared according to (D) above] and 200 ppm of p-tert-butylcatechol were dissolved in methylene chloride and concentrated. The physical and thermodynamic data are summarized in Table 3.

(c) About 2.0 g of the methacrylated polymer prepared according to Example 1(d) above, 0.8 g of 4-(prop-2-en-1-oxy)phenyl-4-methacryloxybenzoate [prepared according to (D) above] and 200 ppm of p-tert-butylcatechol were dissolved in methylene chloride and concentrated. The physical and thermodynamic data are summarized in Table 3.

TABLE 3

| Examples | 2(a) | 2(b) | 2(c) |
|---|---|---|---|
| Reflection peak [nm] | 592 | 536 | — |
| Glass transition temperature* [°C.] | 7 | 14 | 14 |
| Clarification temperature* [°C.] | 152 | 162 | 74 |

*determined with the addition of 500 ppm of p-tert-butyl-catechol (obtained from Janssen Chimica, D-4054 Nettetal 2).

EXAMPLE 3

A mixture according to Example 2 or the polyorganosiloxane according to Example 1(e) above was mixed with 3 percent by weight of 2-methyl-1-(4-(methylthio)phenyl)-2-morpholinopropan-1-one (Irgacure 907, Ciba-Geigy Marienberg GmbH), 0.5 percent by weight of isopropenylthioxanthone (Quantacure ITX, Deutsche Shell Chemie GmbH), 500 ppm of p-tert-butylcatechol and 5 percent by weight of hexanediol dimethacrylate and painted on a glass sheet as a film 20μ in thickness at 80° C. with a doctor blade and exposed for 3 seconds to UV radiation which was produced by an 80 W/cm mercury vapor lamp. In each case a smooth film resulted which was tack-free even when hot. The film showed a reflection color of the cholesterol phase and a haze according to Table 4.

TABLE 4

| Compositions according to Examples | 2(a) | 2(b) | 2(c) | 2(e) |
|---|---|---|---|---|
| Crosslinkable side groups [mol %] | 50 | 50 | 70 | 40 |
| Reflection peak [nm] | 573 | 519 | — | 410 |
| Half-width value* [nm] | 110 | 115 | — | 60 |
| Haze+ [%] | 0 | 0 | 0 | 0 |

+determined by measuring the transmission at 800 nm
*determined by measuring the proportion of right-handed circularly polarized light in transmission

COMPARISON EXAMPLES

Single-Step Synthesis of Methacrylated Liquid-Crystalline Polyorganosiloxanes (a) About 2.25 g of cholesteryl-4-(prop-2-en-1-oxy)-benzoate [cf. Example 1(a)], 1.13 g of (4-methoxyphenyl)-4-(prop-2-en-1-oxy)benzoate (prepared according to DE-A 3,119,459), 0.34 g of 4-(prop-2-en-1-oxy)-phenyl-4-methacryloxybenzoate [prepared according to (D) above] and 0.60 g of tetramethylcyclotetrasiloxane were dissolved in 20 ml of toluene, mixed with 20 mg of dicyclopentadieneplatinum dichloride and boiled under reflux for 10 minutes. After the product was concentrated, it was mixed as described in Example (3) with photoinitiators, reactive diluents and inhibitors and crosslinked by means of UV light. The position and the half-width value of the reflection peak and the haze of the sample are listed in Table 3. The sample gave a smooth clear film when treated with the doctor blade.

(b) About 2.25 g of cholesteryl-4-(prop-2-en-1-oxy)-benzoate, 0.85 g of (4-methoxyphenyl)-4-(prop-2-en-1-oxy)benzoate, 0.68 g of 4-(prop-2-en-1-oxy)phenyl-4-methacryloxybenzoate and 0.60 g of tetramethylcyclotetrasiloxane were reacted according to Comparative Example (a), crosslinked and characterized. The sample gave a smooth clear film when treated with the doctor blade.

(c) About 2.25 g of cholesteryl-4-(prop-2-en-1-oxy)-benzoate, 0.57 g of (4-methoxyphenyl)-4-(prop-2-en-1-oxy)benzoate, 1.01 g of 4-(prop-2-en-1-oxy)phenyl-4-methacryloxybenzoate and 0.60 g of tetramethylcyclotetrasiloxane were reacted according to Comparative Example (a) above, crosslinked and characterized. The sample gave a somewhat rough, slightly hazy film when treated with the doctor blade.

(d) About 2.25 g of cholesteryl-4-(prop-2-en-1-oxy)-benzoate, 0.28 g of (4-methoxyphenyl)-4-(prop-2-en-1-oxy)benzoate, 1.35 g of 4-(prop-2-en-1-oxy)phenyl-4-methacryloxybenzoate and 0.60 g of tetramethylcyclotetrasiloxane were reacted according to Comparative Example (a), crosslinked and characterized. The sample gave a rough hazy film when treated with the doctor blade.

(e) About 2.25 g of cholesteryl-4-(prop-2-en-1-oxy)-benzoate, 1.69 g of 4-(prop-2-en-1-oxy)phenyl-4-methacryloxybenzoate and 0.60 g of tetramethylcyclotetrasiloxane were reacted according to Comparative Example (a), crosslinked and characterized. The sample gave a very rough hazy film when treated with the doctor blade.

TABLE 5

| Comparative Examples | (a) | (b) | (c) | (d) | (e) |
|---|---|---|---|---|---|
| Crosslinkable side groups [mol %] | 10 | 20 | 30 | 40 | 50 |
| Reflection peak [nm] | 590 | 570 | 550 | 530 | 500 |
| Half-width value* [nm] | 120 | 130 | 205 | 240 | >250 |
| Haze+ [%] | 0 | 0 | 7 | 10 | 14 |

+determined at 800 nm
*determined by measuring the proportion of right-handed circularly polarized light in transmission.

What is claimed is:

1. A process for preparing liquid-crystalline polyorganosiloxanes having more than 20 mol percent of crosslinkable methacryloxy and/or acryloxy groups per molecule which is obtained from the reaction of an organosilicon compound selected from the group consisting of an organopolysiloxane having hydrogen atoms bonded directly to silicon atoms, an organosilane having hydrogen atoms bonded directly to silicon atoms and which is capable of being condensed to form organosiloxanes and mixtures thereof, with a compound selected from the group consisting of alkenes, alkynes and mixtures thereof having mesogenic groups which comprises reacting the organosilicon compound in a first step with a compound selected from the group consisting of an alkene, alkyne and mixtures thereof having at least one-non-enolic hydroxyl group protected by a protective group, and in a second step removing the protective group and esterifying the free hydroxyl group with a compound selected from the group consisting of (meth)-acrylic acid, esters, anhydrides, halides thereof, and mixtures thereof with the proviso that if the organosilicon compound is an organosilane, then the organosilane is condensed to an organosiloxane.

2. The process of claim 1, wherein the organosiloxane having hydrogen atoms bonded directly to silicon atoms has units of the formula (I):

$$R_pH_qSiO_{(4-p-q)/2} \qquad (I)$$

where R is selected from the group consisting of $C_1$ to $C_{18}$ hydrocarbon radicals and substituted $C_1$ to $C_{18}$ hydrocarbon radicals; p is an integer having a value of from 0 to 3, with an average value of 1.8 to 2.2; q is an integer having a value of from 0 to 3, with an average value such that at least three hydrogen atoms are bonded directly to silicon atoms per molecule, and the sum of p and q is a maximum of 3.

3. The process of claim 1, wherein the organosilane having hydrogen atoms bonded directly to silicon atoms and is condensable to organosiloxanes is represented by formula (VI)

$$R_rH_sSiY_{(4-r-s)} \qquad (VI)$$

where R is selected from the group consisting of $C_1$ to $C_{18}$ hydrocarbon radicals and substituted $C_1$ to $C_{18}$ hydrocarbon radicals; Y represents a condensable group; r represents an integer with a value of 0 or 1; s represents an integer having a value of from 0 to 3, with an average value of at least 0.1 and the sum of r and s is a maximum of 3.

4. The process or claim 1, wherein the organosilicon compound is a mixture of an organosiloxane having hydrogen atoms bonded directly to silicon atoms with units of formula (I)

$$R_pH_qSiO_{(4-p-q)/2} \tag{I}$$

and an organosilane having hydrogen atoms bonded directly to silicon atoms and is condensable to organosiloxanes is represented by formula (VI)

$$R_rH_sSiY_{(4-r-s)} \tag{VI}$$

where R is selected from the group consisting of $C_1$ to $C_{18}$ hydrocarbon radicals and substituted $C_1$ to $C_{18}$ hydrocarbon radicals; p is an integer having a value of from 0 to 3, with an average value of 1.8 to 2.2; q is an integer having a value of from 0 to 3, with an average value such that at least three hydrogen atoms are bonded directly to silicon atoms per molecule, and the sum of p and q is a maximum of 3; Y represents a condensable group; r represents an integer with a value of 0 or 1; s represents an integer having a value of from 0 to 3, with an average value of at least 0.1 and the sum of r and s is a maximum of 3.

5. The process of claim 1, wherein the alkenes or alkynes having mesogenic groups are represented by formula (VII)

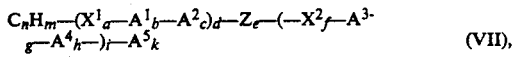
$$C_nH_m-(X^1_a-A^1_b-A^2_c)_d-Z_e-(-X^2_f-A^3_g-A^4_h-)_i-A^5_k \tag{VII},$$

where n represents an integer having a value of from 1 to 20; m has a value of $2n-1$, with the proviso that if n is 2, then m can have a value of (2n-3); $X^1$ and $X^2$ represents divalent radicals selected from the group consisting of —O—, —COO—, —CONH—, —CO—, —S—, —C≡C—, —CH=CH—, —CH=N—, —N=N— and —N=N(O)—; $A^1$, $A^2$, $A^3$ and $A^4$ represent divalent radicals selected from the group consisting of 1,4-phenylene 1,4-cyclohexylene radicals, substituted arylenes having from 1 to 10 carbon atoms, substituted cycloalkylenes having from 1 to 10 carbon atoms and heteroarylenes having from 1 to 10 carbon atoms; Z represents divalent to tetravalent radicals selected from the group consisting of benzene, cyclohexane and cyclopentane radicals; $A^5$ is selected from the group consisting of saturated alkyl, alkoxy and cycloalkyl radicals having from 1 to 16 carbon atoms, olefinically unsaturated alkyl, alkoxy or cycloalkyl radicals having from 1 to 16 carbon atoms, cholestane radicals, cholesteryl radicals, halogen atoms, hydrogen atoms, hydroxyl, nitrile and trialkylsiloxy groups in which the alkyl radicals of the trialkylsiloxy groups have from 1 to 8 carbon atoms; a, b, c, d, f, g, h, i and k each represents integers having a value of from 0 to 3, e is a number having a value of 0 or 1, the sum of a+b+c+d+f+g+h+i+k is at least 2 and the sum of d and i is a maximum of 4.

6. The process of claim 2, wherein the alkenes or alkynes having mesogenic groups are represented by formula (VII)

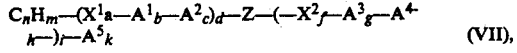
$$C_nH_m-(X^1_a-A^1_b-A^2_c)_d-Z-(-X^2_f-A^3_g-A^4_h-)_i-A^5_k \tag{VII},$$

where n represents an integer having a value of from 1 to 20; m has a value of $2n-1$, with the proviso that if n is 2, then m can have a value of (2n-3); $X^1$ and $X^2$ represent divalent radicals selected from the group consisting of —O—, —COO—, —CONH—, —CO—, —S—, —C≡C—, —CH=CH—, —CH=N, —N=N— and —N=N(O)—; $A^1$, $A^2$, $A^3$ and $A^4$ represent divalent radicals selected from the group consisting of 1,4-phenylene, 1,4-cyclohexylene radicals, substituted arylenes having from 1 to 10 carbon atoms, substituted cycloalkylenes having from 1 to 10 carbon atoms and heteroarylenes having from 1 to 10 carbon atoms; Z represents divalent to tetravalent radicals selected from the group consisting of benzene, cyclohexane and cyclopentane radicals; $A^5$ is selected from the group consisting of alkyl, alkoxy and cycloalkyl radicals having from 1 to 16 carbon atoms, olefinically unsaturated alkyl, alkoxy or cycloalkyl radicals having from 1 to 16 carbon atoms, cholestane radicals, cholesteryl radicals, halogen atoms, hydrogen atoms, hydroxyl, nitrile and trialkylsiloxy groups in which the alkyl radicals of the trialkylsiloxy groups have from 1 to 8 carbon atoms; a, b, c, d, f, g, h, i and k each represent integers having a value of from 0 to 3, e is a number having a value of 0 to 1, the sum of a+b+c+d+f+g+h+i+k is at least 2 and the sum of d and i is a maximum of 4.

7. The process of claim 3, wherein the alkenes or alkynes, having mesogenic groups are represented by formula (VII),

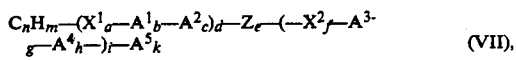
$$C_nH_m-(X^1_a-A^1_b-A^2_c)_d-Z_e-(-X^2_f-A^3_g-A^4_h-)_i-A^5_k \tag{VII},$$

where n represents an integer having a value of from 1 to 20; m has a value of $2n-1$, with the proviso that if n is 2, then m can have a value of (2n-3); $X^1$ and $X^2$ represent divalent radicals selected from the group consisting of —O—, —COO—, —CONH—, —CO—, —S—, —C≡C—, —CH=CH—, —CH=N—, —N=N— and —N=N(O)—; $A^1$, $A^2$, $A^3$ and $A^4$ represent divalent radicals selected from the group consisting of 1,4-phenylene and 1,4-cyclohexylene radicals, substituted arylenes having from 1 to 10 carbon atoms, substituted cycloalkylenes having from 1 to 10 carbon atoms and heteroarylenes having from 1 to 10 carbon atoms; Z represents divalent to tetravalent radicals selected from the group consisting of benzene cyclohexane and cyclopentane radicals; $A^5$ is selected from the group consisting of saturated alkyl, alkoxy or cycloalkyl radicals having from 1 to 16 carbon atoms, olefinically unsaturated alkyl, alkoxy or cycloalkyl radicals having from 1 to 16 carbon toms, cholestane radicals, cholesteryl radicals, halogen atoms, hydrogen atoms, hydroxyl, nitrile and trialkylsiloxy groups in which the alkyl radicals of the trialkylsiloxy groups have from 1 to 8 carbon atoms; a, b, c, d, f, g, h, i and k each represent integers having a value of from 0 to 3, e is a number having a value of 0 or 1, the sum of a+b+c+d+f+g+h+i+k is at least 2 and the sum of d and i is a maximum of 4.

8. The process of claim 4, wherein the alkenes or alkynes having mesogenic groups are represented by formula (VII)

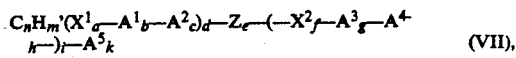
$$C_nH_m'(X^1_a-A^1_b-A^2_c)_d-Z_e-(-X^2_f-A^3_g-A^4_h-)_i-A^5_k \tag{VII},$$

where n represents an integer having a value of from 1 to 20; m has a value of $2n-1$, with the proviso that if n is 2, then m can have a value of (2n-3); $X^1$ and $X^2$ represent divalent radicals selected from the group consisting of —O—, —COO—, —CONH—, —CO—, —S—, —C≡C—, —CH=CH—, —CH=N—, —N=N— and —N=N(O)—; $A^1$, $A^2$, $A^3$ and $A^4$ represent divalent radicals, selected from the group consisting of 1,4-phenylene and 1,4-cyclohexylene radicals, substituted arylenes having from 1 to 10 carbon atoms, substituted cycloalkylenes having from 1 to 10 carbon atoms and heteroarylenes having 1 to 10 carbon atoms; Z represents divalent to tetravalent radicals selected from the group consisting of benzene, cyclohexane and cyclopentane radicals; $A^5$ is selected from the group consisting of alkyl, alkoxy or cycloalkyl radicals having from 1 to 16 carbon atoms, olefinically unsaturated alkyl, alkoxy or cycloalkyl radicals having from 1 to 16 carbon atoms, cholestane radicals, cholesteryl radicals, halogen atoms, hydrogen atoms, hydroxyl, nitrile and trialkylsiloxy groups in which the alkyl radicals of the trialkylsiloxy groups have from 1 to 8 carbon atoms; a, b, c, d, f, g, h, i and k each represent integers having a value of from 0 to 3, e is a number having a value of 0 or 1, the sum of $a+b+c+d+f+g+h+i+k$ is at least 2 and the sum of d and i is a maximum of 4.

9. The process of claim 1, wherein the alkenes have at least one non-enolic hydroxyl group protected by a protective group and have up to 30 carbon atoms, which in addition to carbon atoms and hydrogen atoms, may also contain oxygen atoms, which may interrupt the carbon chain in the form of an ether linkage.

10. The process of claim 2, wherein the alkenes have at least one non-enolic hydroxyl group protected by a protective group and have up to 30 carbon atoms, which in addition to carbon atoms and hydrogen atoms, may also contain oxygen atoms, which may interrupt the carbon chain in the form of an ether linkage or ester linkage.

11. The process of claim 3, wherein the alkenes have at least one non-enolic hydroxyl group protected by a protective group and have up to 30 carbon atoms, which in addition to carbon atoms and hydrogen atoms, may also contain oxygen atoms, which may interrupt the carbon chain in the form of an ether linkage or ester linkage.

12. The process of claim 4, wherein the alkenes have at least one non-enolic hydroxyl group protected by a protective group and have up to 30 carbon atoms, which in addition to carbon atoms and hydrogen atoms, may also contain oxygen atoms, which may interrupt the carbon chain in the form of an ether linkage or ester linkage.

13. The process of claim 5, wherein the alkenes have at least one non-enolic hydroxyl group protected by a protective group and have up to 30 carbon atoms, which in addition to carbon atoms and hydrogen atoms, may also contain oxygen atoms, which may interrupt the carbon chain in the form of an ether linkage or ester linkage.

14. The process of claim 6, wherein the alkenes have at least one non-enolic hydroxyl group protected by a protective group and have up to 30 carbon atoms, which in addition to carbon atoms and hydrogen atoms, may also contain oxygen atoms, which may interrupt the carbon chain in the form of an ether linkage or ester linkage.

15. The process of claim 7, wherein the alkenes have at least one non-enolic hydroxyl group protected by a protective group and have up to 30 carbon atoms, which in addition to carbon atoms and hydrogen atoms, may also contain oxygen atoms, which may interrupt the carbon chain in the form of an ether linkage or ester linkage.

16. A liquid-crystalline polyorganosiloxane having methacryloxy groups and/or acryloxy groups prepared in accordance with the process of claim 1.

17. A liquid-crystalline polyorganosiloxane having methacryloxy groups and/or acryloxy groups prepared in accordance with the process of claim 2.

18. A liquid-crystalline polyorganosiloxane having methacryloxy groups and/or acryloxy groups prepared in accordance with the process of claim 3.

19. A liquid-crystalline polyorganosiloxane having methacryloxy groups and/or acryloxy groups prepared in accordance with the process of claim 4.

20. A liquid-crystalline polyorganosiloxane having methacryloxy groups and/or acryloxy groups prepared in accordance with the process of claim 5.

21. A liquid-crystalline polyorganosiloxane having methacryloxy groups and/or acryloxy groups prepared in accordance with the process of claim 6.

22. A liquid-crystalline polyorganosiloxane having methacryloxy groups and/or acryloxy groups prepared in accordance with the process of claim 7.

23. A composition comprising the liquid crystalline polyorganosiloxane having methacryloxy groups and/or acryloxy groups prepared in accordance with the process of claim 1, wherein the composition contains a compound of the formula

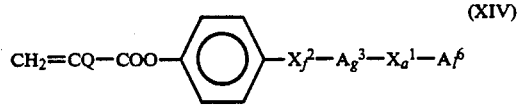

(XIV)

where $A^6$ is selected from the group consisting of saturated alkyl, alkoxy or cycloalkyl radicals having from 1 to 16 carbon atoms, olefinically unsaturated alkyl, alkoxy or cycloalkyl radicals having from 1 to 16 carbon atoms, cholestane radicals, cholesteryl radicals, halogen atoms, hydrogen atoms, hydroxyl, nitrile, trialkylsiloxy groups in which the alkyl radicals of the trialkylsiloxy groups have from 1 to 8 carbon atoms and a radical of the formula $CH_2=CQ-COO-(R'''')_u-$; Q represents a hydrogen atom or a methyl group; $R''''$ represents divalent radicals selected from the group consisting of $-CH_2-$, $-O-CH_2-$, $-O-CH_2-CH_2-$ and $-O-CH_2-CH_2-CH_2-$; u is an integer having a value of from 0 to 20; l is 0 or 1; $X^1$ and $X^2$ represent divalent radicals selected from the group consisting of $-O-$, $-COO-$, $-CONH-$, $-CO-$, $-S-$, $-C\equiv C-$, $-CH=CH-$, $-CH=N-$, $-N=N-$ and $-N=N(O)-$; $A^3$ represents divalent radicals, selected from the group consisting of 1,4-phenylene and 1,4-cyclohexylene radicals, substituted arylenes having from 1 to 10 carbon atoms, substituted cycloalkylenes having from 1 to 10 carbon atoms and heteroarylenes having from 1 to 10 carbon atoms; f, has a value of 1, and a and g each have a value of 0 or 1.

24. A composition comprising the liquid crystalline polyorganosiloxane having methacryloxy groups and/or acryloxy groups prepared in accordance with the process of claim 2, wherein the composition contains a compound of the formula

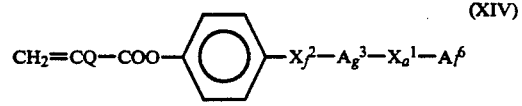

(XIV)

where $A^6$ is selected from the group consisting of saturated alkyl, alkoxy or cycloalkyl radicals having from 1 to 16 carbon atoms, olefinically unsaturated alkyl, alkoxy or cycloalkyl radicals having from 1 to 16 carbon atoms, cholestane radicals, cholesteryl radicals, halogen atoms, hydrogen atoms, hydroxyl, nitrile, trialkylsiloxy groups in which the alkyl radicals of the trialkylsiloxy groups have from 1 to 8 carbon atoms and a radical of the formula $CH_2=CQ-COO-(R'''')_u-$; Q represents a hydrogen atom or a methyl group; R'''' represents divalent radicals selected from the group consisting of $-CH_2-$, $-O-CH_2-$, $-O-CH_2-CH_2-$ and $-O-CH_2-CH_2-CH_2-$; u is an integer having a value of from 0 to 20; l is 0 or 1; $X^1$ and $X^2$ represent divalent radicals selected from the group consisting of $-O-$, $-COO-$, $-CONH-$, $-CO-$, $-S-$, $-C\equiv C-$, $-CH=CH-$, $-CH=N-$, $-N=N-$ and $-N=N(O)-$; $A^3$ represents divalent radicals, selected from the group consisting of 1,4-phenylene and 1,4-cyclohexylene radicals, substituted arylenes having from 1 to 10 carbon atoms, substituted cycloalkylenes having from 1 to 10 carbon atoms and heteroarylenes having from 1 to 10 carbon atoms; f, has a value of 1, and a and g each have a value of 0 or 1.

25. A composition comprising the liquid crystalline polyorganosiloxane having methacryloxy groups and-/or acryloxy groups prepared in accordance with the process of claim 3, wherein the composition contains a compound of the formula

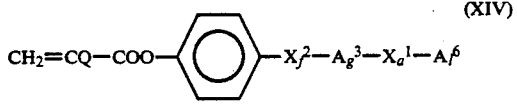
(XIV)

where $A^6$ is selected from the group consisting of saturated alkyl, alkoxy or cycloalkyl radicals having from 1 to 16 carbon atoms, olefinically unsaturated alkyl, alkoxy or cycloalkyl radicals having from 1 to 16 carbon atoms, cholestane radicals, cholesteryl radicals, halogen atoms, hydrogen atoms, hydroxyl, nitrile, trialkylsiloxy groups in which the alkyl radicals of the trialkylsiloxy groups have from 1 to 8 carbon atoms and a radical of the formula $CH_2=CQ-COO-(R'''')_u-$; Q represents a hydrogen atom or a methyl group; R'''' represents divalent radicals selected from the group consisting of $-CH_2-$, $-O-CH_2-$, $-O-CH_2-CH_2-$ and $-O-CH_2-CH_2-CH_2-$; u is an integer having a value of from 0 to 20; l is 0 or 1; $X^1$ and $X^2$ represent divalent radicals selected from the group consisting of $-O-$, $-COO-$, $-CONH-$, $-CO-$, $-S-$, $-C\equiv C-$, $-CH=CH-$, $-CH=N-$, $-N=N-$ and $-N=N(O)-$; $A^3$ represents divalent radicals, selected from the group consisting of 1,4-phenylene and 1,4-cyclohexylene radicals, substituted arylenes having from 1 to 10 carbon atoms, substituted cycloalkylenes having from 1 to 10 carbon atoms and heteroarylenes having from 1 to 10 carbon atoms; f, has a value of 1, and a and g each have a value of 0 or 1.

26. A composition comprising the liquid crystalline polyorganosiloxane having methacryloxy groups and-/or acryloxy groups prepared in accordance with the process of claim 4, wherein the composition contains a compound of the formula

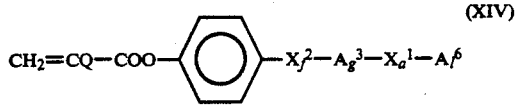
(XIV)

where $A^6$ is selected from the group consisting of saturated alkyl, alkoxy or cycloalkyl radicals having from 1 to 16 carbon atoms, olefinically unsaturated alkyl, alkoxy or cycloalkyl radicals having from 1 to 16 carbon atoms, cholestane radicals, cholesteryl radicals, halogen atoms, hydrogen atoms, hydroxyl, nitrile, trialkylsiloxy groups in which the alkyl radicals of the trialkylsiloxy groups have from 1 to 8 carbon atoms and a radical of the formula $CH_2=CQ-COO-(R'''')_u-$; Q represents a hydrogen atom or a methyl group; R'''' represents divalent radicals selected from the group consisting of $-CH_2-$, $-O-CH_2-$, $-O-CH_2-CH_2-$ and $-O-CH_2-CH_2-CH_2-$; u is an integer having a value of from 0 to 20; l is 0 or 1; $X^1$ and $X^2$ represent divalent radicals selected from the group consisting of $-O-$, $-COO-$, $-CONH-$, $-CO-$, $-S-$, $-C\equiv C-$, $-CH=CH-$, $-CH=N-$, $-N=N-$ and $-N=N(O)-$; $A^3$ represents divalent radicals, selected from the group consisting of 1,4-phenylene and 1,4-cyclohexylene radicals substituted arylenes having from 1 to 10 carbon atoms, substituted cycloalkylenes having from 1 to 10 carbon atoms and heteroarylenes having from 1 to 10 carbon atoms; f, has a value of 1, and a and g each have a value of 0 or 1.

27. A composition comprising the liquid crystalline polyorganosiloxane having methacryloxy groups and-/or acryloxy groups prepared in accordance with the process of claim 5, wherein the composition contains a compound of the formula

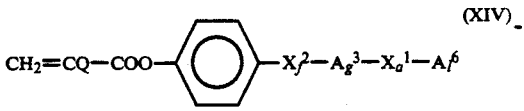
(XIV)

where $A^6$ is selected from the group consisting of saturated alkyl, alkoxy or cycloalkyl radicals having from 1 to 16 carbon atoms, olefinically unsaturated alkyl, alkoxy or cycloalkyl radicals having from 1 to 16 carbon atoms, cholestane radicals, cholesteryl radicals, halogen atoms, hydrogen atoms, hydroxyl, nitrile, trialkylsiloxy groups in which the alkyl radicals of the trialkylsiloxy groups have from 1 to 8 carbon atoms and a radical of the formula $CH_2=CQ-COO-(R'''')_u-$; Q represents a hydrogen atom or a methyl group; R'''' represents divalent radicals selected from the group consisting of $-CH_2-$, $-O-CH_2-$, $-O-CH_2-CH_2-$ and $-O-CH_2-CH_2-CH_2-$; u is an integer having a value of from 0 to 20; l is 0 or 1; $X^1$ and $X^2$ represent divalent radicals selected from the group consisting of $-O-$, $-COO-$, $-CONH-$, $-CO-$, $-S-$, $-C\equiv C-$, $-CH=CH-$, $-CH=N-$, $-N=N-$ and $-N=N(O)-$; $A^3$ represents divalent radicals, selected from the group consisting of 1,4-phenylene and 1,4-cyclohexylene radicals, substituted arylenes having from 1 to 10 carbon atoms, substituted cycloalkylenes having from 1 to 10 carbon atoms and heteroarylenes having from 1 to 10 carbon atoms; f, has a value of 1, and a and g each have a value of 0 or 1.

28. A composition comprising the liquid crystalline polyorganosiloxane having methacryloxy groups and-/or acryloxy groups prepared in accordance with the process of claim 6, wherein the composition contains a compound of the formula

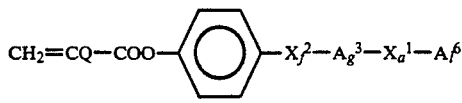

(XIV)

where $A^6$ is selected from the group consisting of saturated alkyl, alkoxy or cycloalkyl radicals having from 1 to 16 carbon atoms, olefinically unsaturated alkyl, alkoxy or cycloalkyl radicals having from 1 to 16 carbon atoms, cholestane radicals, cholesteryl radicals, halogen atoms, hydrogen atoms, hydroxyl, nitrile, trialkylsiloxy groups in which the alkyl radicals of the trialkylsiloxy groups have from 1 to 8 carbon atoms and a radical of the formula $CH_2=CQ-COO-(R'''')_u-$; Q represents a hydrogen atom or a methyl group; $R''''$ represents divalent radicals selected from the group consisting of $-CH_2-$, $-O-CH_2-$, $-O-CH_2-CH_2-$ and $-O-CH_2-CH_2-CH_2-$; u is an integer having a value of from 0 to 20; l is 0 or 1; $X^1$ and $X^2$ represent divalent radicals selected from the group consisting of $-O-$, $-COO-$, $-CONH-$, $-CO-$, $-S-$, $-C\equiv C-$, $-CH=CH-$, $-CH=N-$, $-N=N-$ and $-N=N(O)-$; $A^3$ represents divalent radicals, selected from the group consisting of 1,4-phenylene and 1,4-cyclohexylene radicals, substituted arylenes having from 1 to 10 carbon atoms, substituted cycloalkylenes having from 1 to 10 carbon atoms and heteroarylenes having 1 to 10 carbon atoms; f, has a value of 1, and a and g each have a value of 0 or 1.

29. A composition comprising the liquid crystalline polyorganosiloxane having methacryloxy groups and/or acryloxy groups prepared in accordance with the process of claim 7, wherein the composition contains a compound of the formula

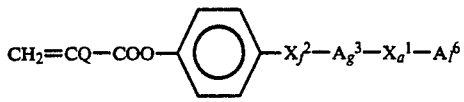

(XIV)

where $A^6$ is selected from the group consisting of saturated alkyl, alkoxy or cycloalkyl radicals having from 1 to 16 carbon atoms, olefinically unsaturated alkyl, alkoxy or cycloalkyl radicals having from 1 to 16 carbon atoms, cholestane radicals, cholesteryl radicals, halogen atoms, hydrogen atoms, hydroxyl, nitrile, trialkylsiloxy groups in which the alkyl radicals of the trialkylsiloxy groups have from 1 to 8 carbon atoms and a radical of the formula $CH_2=CQ-COO-(R'''')_u-$; Q represents a hydrogen atom or a methyl group; $R''''$ represents divalent radicals selected from the group consisting of $-CH_2-$, $-O-CH_2-$, $-O-CH_2-CH_2-$ and $-O-CH_2-CH_2-CH_2-$; u is an integer having a value of from 0 to 20; l is 0 or 1; $X^1$ and $X^2$ represent divalent radicals selected from the group consisting of $-O-$, $-COO-$, $-CONH-$, $-CO-$, $-S-$, $-C\equiv C-$, $-CH=CH-$, $-CH=N-$, $-N=N-$ and $-N=N(O)-$; $A^3$ represents divalent radicals, selected from the group consisting of 1,4-phenylene and 1,4-cyclohexylene radicals, substituted arylenes having from 1 to 10 carbon atoms, substituted cycloalkylenes having from 1 to 10 carbon atoms and heteroarylenes having 1 to 10 carbon atoms; f, has a value of 1, and a and g each have a value of 0 or 1.

* * * * *